METHOD OF PRODUCING A CONTROL SYSTEM
Filed Aug. 18, 1967
FIG. 1.
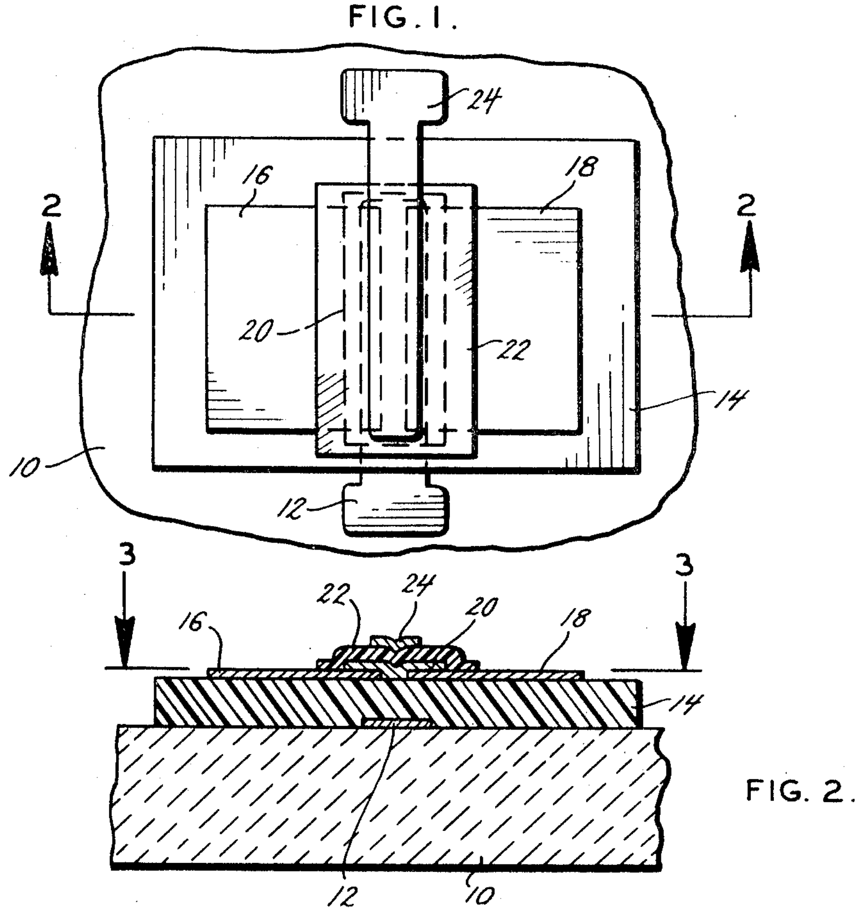
FIG. 1, FIG. 2.
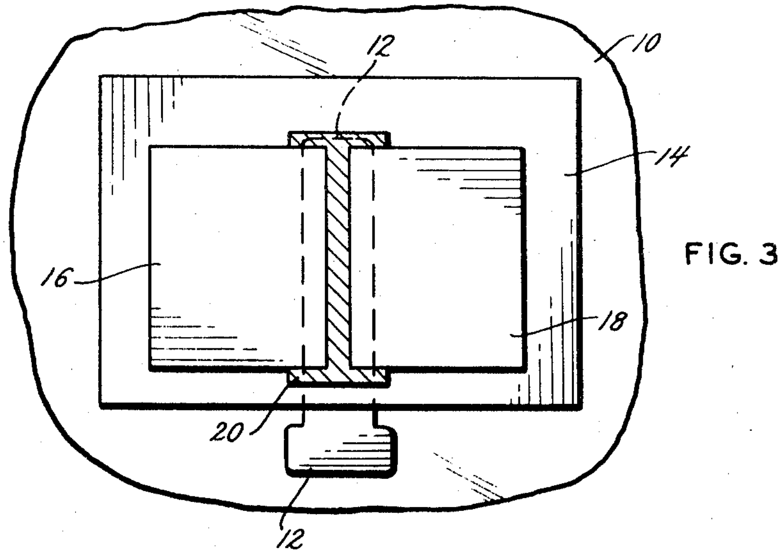
FIG. 3.

3,470,610

METHOD OF PRODUCING A CONTROL SYSTEM

Gary C. Breitweiser, St. Louis, Mo., assignor to Conductron Corporation, St. Charles, Mo., a corporation of Delaware Filed Aug. 18, 1967, Ser. No. 661,587
Int. Cl. B01j *17/00;* H01l *11/14*
U.S. Cl. 29—571 6 Claims

ABSTRACT OF THE DISCLOSURE

The threshold gate voltage of an insulated-gate field-effect device can be set at a predetermined level by providing a dielectric layer adjacent the active area of that insulated-gate field-effect device and by providing a desired concentration of temperature-freed ions adjacent that surface of that dielectric layer which is immediately adjacent that active area of that insulated-gate field-effect device.

This invention relates to improvements in control systems. More particularly, this invention relates to improvements in insulated-gate field-effect devices and to improvements in methods of making same.

It is, therefore, an object of the present invention to provide an improved insulated-gate field-effect device and an improved method of making same.

In the fabrication of insulated-gate field-effect devices, the threshold gate voltages of those insulated-gate field-effect devices can fail to fall within the desired range of threshold gate voltages. It would be desirable to provide an insulated-gate field-effect device which could have the threshold gate voltage thereof changed, after that insulated-gate field-effect device had been fabricated, to fall within a desired range of threshold gate voltages. The present invention provides such an insulated-gate field-effect device; and it is, therefore, an object of the present invention to provide an insulated-gate field-effect device that can have the threshold gate voltage thereof changed, after that insulated-gate field-effect device has been fabricated, to fall within a desired range of threshold gate voltages.

The insulated-gate field-effect device provided by the present invention has a dielectric layer adjacent the active area thereof; and a desired concentration of temperature-freed ions is provided in that surface of that dielectric layer which is immediately adjacent that active area of that insulated-gate field-effect device. That desired concentration of temperature-freed ions will modify the electrical characteristics of the critical area of that insulated-gate field-effect device and thereby set the desired threshold gate voltage for that insulated-gate field-effect device. It is, therefore, an object of the present invention to provide an insulated-gate field-effect device which has a dielectric layer adjacent the active area thereof, and which has a desired concentration of temperature-freed ions in that surface of that dielectric layer which is immediately adjacent that active area of that insulated-gate field-effect device.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and and that the invention will be defined by the appended claims.

In the drawing, FIG. 1 is a plan view of one preferred embodiment of insulated-gate field-effect device that is made in accordance with the principles and teachings of the present invention, FIG. 2 is a sectional view through the insulated-gate field-effect device of FIG. 1, and it is taken along the plane indicated by the line 2—2 in FIG. 1, and FIG. 3 is another sectional view through the insulated-gate field-effect device of FIG. 1, and it is taken along the plane indicated by the line 3—3 in FIG. 2.

Referring to the drawing in detail, the numeral 10 denotes a substrate of an insulating material; and that substrate can be made from glass, fused silica, alumina, or the like. The numeral 12 denotes an electrode which is disposed at the upper face of the substrate 10; and that electrode can be made of any suitable metal. The numeral 14 denotes a dielectric layer which overlies the substrate 10 and the electrode 12; and that dielectric layer has a dopant therein. That dielectric layer can be made of silicon monoxide, silicon dioxide, silicon nitride, titanium dioxide, tantalum oxide, or the like; and dopants such as the halides of sodium, potassium, cesium and rubidium can be added to that dielectric layer. Those dopants will usually be added to the dielectric layer 14 after that dielectric layer has been formed; but, in some instances, those dopants can be incorporated into that dielectric layer as that dielectric layer is formed. The numeral 16 denotes a metal electrode which overlies part of the dielectric layer 14; and the numeral 18 denotes a second metal electrode which overlies another part of that dielectric layer. The metal electrodes 16 and 18 are spaced apart a short distance; and the confronting portions of those electrodes are overlain by a layer 20 of semi-conductor, such as N type cadmium selenide. The layer 20 also fills the space between the confronting portions of the metal electrodes 16 and 18. The numeral 22 denotes a dielectric layer which overlies the layer 20 of semi-conductor and which engages portions of the upper surfaces of the metal electrodes 16 and 18. That dielectric layer can be made of silicon monoxide, silicon dioxide, silicon nitride, titanium dioxide, tantalum oxide, or the like. The numeral 24 denotes a metal electrode which is formed at the outer surface of the dielectric layer 22, and which extends laterally beyond the confronting portions of the metal electrodes 16 and 18. Those metal electrodes, the layer 20 of semi-conductor, the dielectric layer 22, and the metal electrode 24 constitute a thin film, insulated-gate field-effect transistor that is similar to a standard and usual thin film, insulated-gate field-effect transistor. However, that thin film, insulated-gate field-effect transistor differs from the usual thin film insulated-gate field-effect transistor in being mounted on the doped dielectric layer 14.

After the multi-layer composite structure shown in FIGS. 1 and 2 has been fabricated, the electrodes 16, 18 and 24 can be connected to a suitable testing circuit to check the threshold gate voltage of the insulated-gate field-effect transistor constituted by those electrodes, the semi-conductor layer 20, and the dielectric layer 22. If that threshold gate voltage falls within the desired threshold gate voltage range, the multi-layer composite structure of FIGS. 1 and 2 will not require any further electrical processing. However, if that threshold gate voltage does not fall within the desired threshold gate voltage range, the electrodes 16, 18 and 24 will be disconnected from the testing circuit and will then be connected together and to one terminal of a source of D.C. voltage. The other terminal of that source of D.C. voltage will be connected to the electrode 12 which underlies the dielectric layer 14.

If the threshold gate voltage of an insulated-gate field-effect transistor, which has an N type semi-conductor incorporated therein, is above the desired threshold gate voltage range—and whenever the threshold gate voltage of such an insulated-gate field-effect transistor does not fall within the desired threshold gate voltage range it usually is above that range—the electrodes 16, 18 and 24 will be connected to the negative terminal of the source of D.C. voltage and the electrode 12 will be connected to the positive terminal of that source of D.C. voltage. The multi-layer composite structure of FIGS. 1 and 2 will then be heated to a temperature at which the temperature-freed positive ions in the dielectric layer 14 will become readily mobile; and, as that multi-layer composite structure approaches that temperature, the temperature-freed positive ions that are above and in register with the electrode 12 will start drifting away from that electrode and toward the interface between that dielectric layer and the layer 20 of semi-conductor. That multi-layer composite structure will be maintained at that temperature and that D.C. voltage will be applied to the electrode 12 and to the interconnected electrodes 16, 18 and 24, for a length of time which should enable enough of the temperature-freed positive ions to drift toward that interface to provide the desired threshold gate voltage for the insulated-gate field-effect transistor.

That threshold gate voltage will then be checked by disconnecting the electrode 12 and the interconnected electrodes 16, 18 and 24 from the source of D.C. voltage, by disconnecting the electrodes 16, 18 and 24 from each other, and by again connecting those electrodes to the testing circuit. If enough temperature-freed positive ions have drifted toward the interface between the dielectric layer 14 and the layer 20 of semi-conductor to provide the desired threshold gate voltage for the insulated-gate field-effect transistor, the electrodes 16, 18 and 24 can be disconnected from the testing circuit; and the temperature of the multi-layer composite structure of FIGS. 1 and 2 can be permitted to fall to room temperature. As the temperature of that multi-layer composite structure falls to room temperature, the temperature-freed positive ions in the dielectric layer 14 will become substantially immobilized; and the abnormally-high concentration of temperature-freed positive ions, which are adjacent the interface between the dielectric layer 14 and the layer 20 of semiconductor and which are in register with the electrode 12, will continue to hold the threshold gate voltage of the insulated-gate field-effect transistor at the desired value.

However, if enough temperature-freed positive ions have not drifted toward the interface between the dielectric layer 14 and the layer 20 of semi-conductor to provide the desired threshold gate voltage for the insulated-gate field-effect transistor, the electrodes 16, 18 and 24 will again be interconnected and will again be connected to the negative terminal of the source of D.C. voltage, and the electrode 12 will again be connected to the positive terminal of that source of D.C. voltage. The D.C. voltage developed by that source and the elevated temperature of the multi-layer composite structure of FIGS. 1 and 2 will then cause further temperature-freed positive ions to drift toward the interface between the dielectric layer 14 and the layer 20 of semi-conductor. At the end of a period of time which is long enough to enable enough of the temperature-freed positive ions to drift toward that interface to provide the desired threshold gate voltage for the insulated-gate field-effect transistor, the elecrodes 16, 18 and 24 will again be separated from each other and from the negative terminal of the source of D.C. voltage and the electrode 12 will again be disconnected from the positive terminal of that source of voltage. Thereupon, the electrodes 16, 18 and 24 can be connected to the testing circuit to determine whether the threshold gate voltage of the insulated-gate field-effect transistor has been brought within the desired range of threshold gate voltages. The ion-drifting process and the threshold gate voltage testing step can be alternated until the exact desired threshold gate voltage is attained. At such time, the temperature of the multi-layer composite structure of FIGS. 1 and 2 can be permitted to fall to room temperature; and the temperature-freed positive ions in the dielectric layer 14 will become substantially immobilized. The resulting abnormally high concentration of temperature-freed positive ions, which are adjacent the interface between the dielectric layer 14 and the layer 20 of semi-conductor and which are in register with the electrode 12, will continue to hold the threshold gate voltage of the insulated-gate field-effect transistor at the desired value.

If at any time during the ion-drifting process, the concentration of temperature-freed positive ions adjacent the interface between the dielectric layer 14 and the layer 20 of semi-conductor became so heavy that the threshold gate voltage of the insulated-gate field-effect transistor fell below the desired range of threshold gate voltages, the electrodes 16, 18 and 24 could be interconnected and then connected to the positive terminal of the source of D.C. voltage, and the electrode 12 could be connected to the negative terminal of that source of voltage. The resulting application of oppositely-polarized D.C. voltage to the multi-layer composite structure of FIGS. 1 and 2 would coact with the elevated temperature of that multi-layer composite structure to drift enough of the temperature-freed positive ions away from the interface between the dielectric layer 14 and the layer 20 of semi-conductor to raise the threshold gate voltage of the insulated-gate field-effect transistor to the desired value.

In one preferred embodiment of insulated-gate field-effect transistor that is made in accordance with the principles and teachings of the present invention, the substrate 10 will be made from glass and will be less than one-quarter of an inch thick. The electrode 12 will be formed on the upper surface of that substrate by a vacuum metallization process; and the dielectric layer 14 will be silicon monoxide, and will be about five thousand angstrom units thick. The dopant will be sodium chloride. The electrodes 16 and 18 will be formed on the upper surface of that dielectric layer by a vacuum metallization process; and the layer 20 will be N type cadmium selenide. The dielectric layer 22 will be silicon monoxide; and the electrode 24 will be formed on the upper surface of that dielectric layer by a vacuum metallization process.

The temperature to which the multi-layer composite structure of FIGS. 1 and 2 must be heated, to free the temperature-freed positive ions in the dielectric layer 14 thereof, is relatively low—being in the range of one hundred to three hundred and fifty degrees centigrade. The D.C. voltage that is applied to that multi-layer composite structure to cause the temperature-freed positive ions in the dielectric layer 14 to drift toward the interface between that dielectric layer and the layer 20 should be between one hundred thousand volts per centimeter of thickness of that dielectric layer and a value somewhat below the breakdown voltage of that dielectric layer; but, because that dielectric layer is so thin, that voltage will be relatively low—being in the range of ten to twenty volts. The time required for the temperature-freed positive ions in the dielectric layer 14 to drift toward that interface is a function of the temperature of the multi-layer composite structure of FIGS. 1 and 2 and of the voltage applied to that multi-layer composite structure; but that time can be relatively short, and can be a matter of just a few minutes. In the said one preferred embodiment of insulated-gate field-effect transistor provided by the present invention, that multi-layer composite structure will be heated to a temperature of one hundred and seventy-five degrees centigrade, the D.C. voltage applied to the electrodes 12 and 24 will be twelve volts, and that voltage and that temperature will be maintained for fifteen minutes.

If the layer 20 of the multi-layer composite structure of FIGS. 1 and 2 is made of an N type semi-conductor, such as N-type cadmium selenide, and if the desired range of threshold gate voltages for the insulated-gate field-effect transistor of that multi-layer composite structure is high, the threshold gate voltage of that insulated-gate field-effect transistor at the time that insulated-gate field-effect transistor is fabricated may be below that range. In that event, the interconnected electrodes 16, 18 and 24 will be connected to the positive terminal of the source of D.C. voltage and the electrode 12 will be connected to the negative terminal of that source of voltage; and the temperature-freed positive ions will drift away from, rather than toward, the interface between the dielectric layer 14 and the layer 20 of semi-conductor. The resulting abnormally-low concentration of temperature-freed positive ions in that portion of the dielectric layer 14 which is immediately adjacent that interface and which is in register with the electrode 12 will enable the negative ions in that portion of that dielectric layer to increase the threshold gate voltage of the insulated-gate field-effect transistor to the desired value. To make sure that enough negative ions will be present in that portion of the dielectric layer 14, it will be advisable to form that dielectric layer by a process, such as an anodizing process, which characteristically produces a relatively high concentration of negative ions in the dielectric layer.

If the layer 20 of the multi-layer composite structure of FIGS. 1 and 2 is made of P type semi-conductor, such as P type silicon, and if the desired range of threshold gate voltages for the insulated-gate field-effect transistor of that multilayer composite structure is high, the threshold gate voltage of that insulated-gate field-effect transistor at the time that insulated-gate field-effect transistor is fabricated may be below that range. In that event, the interconnected electrodes 16, 18 and 24 will be connected to the negative terminal of the source of D.C. voltage and the electrode 12 will be connected to the positive terminal of that source of voltage; and the temperature-freed positive ions will drift toward the interface between the dielectric layer 14 and the layer 20 of semi-conductor. The resulting abnormally-high concentration of temperature-freed positive ions in that portion of the dielectric layer 14 which is immediately adjacent that interface and which is in register with the electrode 12 will enable that dielectric layer to increase the threshold gate voltage of the insulated-gate field-effect transistor to the desired value.

If the layer 20 of the multi-layer composite structure of FIGS. 1 and 2 is made of a P type semi-conductor, such as P type silicon, and if the desired range of threshold gate voltages for the insulated-gate field-effect transistor of that multi-layer composite structure is low, the threshold gate voltage of that insulated-gate field-effect transistor at the time that insulated-gate field-effect transistor is fabricated may be above that range. In that event, the interconnected electrodes 16, 18 and 24 will be connected to the positive terminal of the source of D.C. voltage and the electrode 12 will be connected to the negative terminal of that source of voltage; and the temperature-freed positive ions will drift away from, rather than toward the interface between the dielectric layer 14 and the layer 20 of semi-conductor. The resulting abnormally-low concentration of temperature-freed positive ions in that portion of the dielectric layer 14 which is immediately adjacent that interface and which is in register with the electrode 12 will enable the negative ions in that portion of that dielectric layer to decrease the threshold gate voltage of the insulated-gate field-effect transistor to the desired value. To make sure that enough negative ions will be present in that portion of the dielectric layer 14, it will be advisable to form that dielectric layer by a process, such as an anodizing process, which characteristically produces a relatively high concentration of negative ions in the dielectric layer.

It should thus be apparent that the present invention can provide many different threshold gate voltages for insulated-gate field-effect transistors. As a result, that invention should make insulated-gate field-effect transistors even more versatile, and hence more valuable, than they are today.

The dielectric layer 14 is shown in FIGS. 1–3 as being relatively small in area and as having just one electrode 12 at the lower surface thereof. However, where desired, that dielectric layer could be made so it was quite large in area and so it had a number of electrodes 12 at the lower surface thereof; and, where that was done, a number of insulated-gate field-effect transistors could be formed on the upper surface of that dielectric layer. All of those insulated-gate field-effect transistors could be given the same threshold gate voltage by appropriate selection of the individually-different lengths of time and of the polarities of the electric fields used to effect the drifting of the ions in those portions of the dielectric layer which are adjacent the critical areas of those insulated-gate field-effect transistors. Those insulated-gate field-effect transistors could, if desired, be given specifically different threshold gate voltages by appropriate selection of the lengths of time and of the polarities of the electric fields used to effect the drifting of the ions in those portions of the dielectric layer which are adjacent the critical areas of those insulated-gate field-effect transistors. After the various insulated-gate field-effect transistors on the upper surface of the dielectric layer 14 have been given the desired threshold gate voltages, the overall multi-layer composite structure will be permitted to cool to room temperature to substantially immobilize the temperature-freed positive ions in that dielectric layer. That dielectric layer and the substrate 10 can then be subdivided to provide any desired number of separate or grouped insulated-gate field-effect transistors.

The electrodes 16, 18 and 24 are connected together, during the ion-drifting process, to avoid the development of an electric field between one or more of them which could adversely affect the dielectric layer 22 or the layer 20 of semi-conductor. However, once the desired concentration of temperature-freed positive ions has been established in the appropriate portion of the dielectric layer 14, the electrodes 16, 18 and 24 will be separated from each other. That concentration of temperature-freed positive ions will remain substantially unchanged throughout the life of the insulated-gate field-effect transistor of which the electrodes 16, 18 and 24 are a part, because those ions will be outside of the electric field which is developed between the electrodes 16 and 18 and between those electrodes and the electrode 24. As a result that insulated-gate field-effect transistor will have a desirably high degree of stability.

The present invention is usable in making thin film insulated-gate field-effect transistors which have staggered or coplanar configurations. Also, that invention is usable in making diffusion-type, as well as thin film, insulated-gate field-effect transistors. In making a diffusion-type insulated-gate field-effect transistor, it will usually be desirable to use a thin sapphire crystal as the dielectric layer 14 and to grow a thin layer of single crystal silicon as the layer 20 of semiconductor. That sapphire crystal will be sturdy and rugged, and will eliminate all need of a substrate such as the substrate 10. The electrodes 16 and 18 will then be diffused all the way through that thin layer of single crystal silicon to the sapphire crystal; and the electrode 12 will be formed on the under surface of that sapphire crystal.

The present invention is usable in making depletion-type insulated-gate field-effect transistors, and also is usable in making enhancement-type insulated-gate field-effect transistors. Actually, that invention is usable in making almost any insulated-gate field-effect device wherein the voltage-current characteristic, the threshold gate voltage, or the transconductance of that insulated-gate field-effect device can be varied by changing the concentration of temperature-free positive ions in a dielectric layer adjacent the active area of that insulated-gate field-effect device. The effect which changes in concentration of temperature-freed positive ions in a dielectric layer adjacent the active area of an insulated-gate field-effect device is believed to be an alteration of the energy band structure in the layer of semi-conductor at that active area.

If desired, the electrode 24 could be formed on the substrate 10, the dielectric layer 22 could be made to overlie that electrode, the layer 20 of semi-conductor could be made to overlie that dielectric layer, the electrodes 16 and 18 could be made to overlie that layer of semi-conductor, the dielectric layer 14 could be made to overlie those electrodes, and the electrode 12 could be made to overlie that dielectric layer. Further, the electrode 12 could be made wider than shown by FIGS. 1–3. It should thus be clear that the present invention is quite versatile and is quite comprehensive.

Whereas the drawing and accompanying description have shown and described a preferred embodiment of the present invention it should be apparent to those skilled in the art that various changes may be made in the form of the invention without affecting the scope thereof.

What I claim is:

1. The method of making an insulated-gate field-effect device, that has a layer of semi-conductor and a dielectric layer and a gate electrode, so it has a desired voltage-current characteristic which comprises disposing an additional dielectric layer adjacent the active area of said insulated-gate field-effect device, said additional dielectric layer being in addition to the dielectric layer of said insulated-gate field-effect device and being spaced away from the gate electrode of said insulated-gate field-effect device, heating said additional dielectric layer to a temperature at which temperature-freed ions in said additional dielectric layer become readily mobile, and developing a D.C. electric field in that portion of said additional dielectric layer which is adjacent said active area of said insulated-gate field-effect device to effect drifting of said temperature-freed ions in said portion of said additional dielectric layer relative to said active area of said insulated-gate field-effect device to provide an abnormal concentration of temperature-freed ions in said portion of said additional dielectric layer, and permitting said additional dielectric layer to cool down and thereby substantially immobilize said temperature-freed ions in said portion of said additional dielectric layer.

2. The method of making an insulated-gate field-effect device, that has a layer of semi-conductor and a dielectric layer and a gate electrode, so it has a desired voltage-current characteristic which comprises disposing an additional dielectric layer adjacent the active area of said insulated-gate field-effect device, said additional dielectric layer being in addition to the dielectric layer of said insulated-gate field-effect device and being spaced away from the gate electrode of said insulated-gate field-effect device, applying an electrode adjacent that surface of said additional dielectric layer which is opposite to that surface of said additional dielectric layer which is adjacent said active area of said insulated-gate field-effect device heating said additional dielectric layer to a temperature at which temperature-freed ions in said additional dielectric layer become readily mobile, developing a D.C. electric field in that portion of said additional dielectric layer which is adjacent said active area of said insulated-gate field-effect device to effect drifting of said temperature-freed ions in said portion of said additional dielectric layer relative to said active area of said insulated-gate field-effect device to provide an abnormal concentration of temperature-freed ions in said portion of said additional dielectric layer, causing said electric field in that portion of said additional dielectric layer which is adjacent said active area of said insulated-gate field-effect device to extend from said electrode into said additional dielectric layer, and permitting said additional dielectric layer to cool down and thereby substantially immobilize said temperature-freed ions in said portion of said additional dielectric layer.

3. The method of making an insulated-gate field-effect device, that has a layer of semi-conductor and a dielectric layer and a gate electrode, so it has a desired voltage-current characteristic which comprises disposing an additional dielectric layer adjacent the active area of said insulated-gate field-effect device, said additional dielectric layer being in addition to the dielectric layer of said insulated-gate field-effect device and being spaced away from the gate electrode of said insulated-gate field-effect device, heating said additional dielectric layer to a temperature at which temperature-freed ions in said additional dielectric layer become readily mobile, and developing a D.C. electric field in that portion of said additional dielectric layer which is adjacent said active area of said insulated-gate field-effect device to effect drifting of said temperature-freed ions in said portion of said additional dielectric layer relative to said active area to said insulated-gate field-effect device to provide an abnormal concentration of temperature-freed ions in said portion of said additional dielectric layer, and permitting said additional dielectric layer to cool down and thereby substantially immobilize said temperature-freed ions in said portion of said additional dielectric layer, said additional dielectric layer being heated to a temperature in the range of one hundred to three hundred and fifty degrees centigrade.

4. The method of making an insulated-gate field-effect device as claimed in claim 1 wherein said electric field is established by electrodes at opposite sides of said additional dielectric layer, and wherein said electrodes at said opposite sides of said additional dielectric layer have opposite polarities.

5. The method of making an insulated-gate field-effect device, that has a layer of semi-conductor and a dielectric layer and a gate electrode, so it has a desired voltage-current characteristic which comprises disposing an additional dielectric layer adjacent the active area of said insulated-gate field-effect device, said additional dielectric layer being in addition to the dielectric layer of said insulated-gate field-effect device and being spaced away from the gate electrode of said insulated-gate field-effect device, heating said additional dielectric layer to a temperature at which temperature-freed ions in said additional dielectric layer become readily mobile, and developing a D.C. electric field in that portion of said additional dielectric layer which is adjacent said active area of said insulated-gate field-effect device to effect drifting of said temperature-freed ions in said portion of said additional dielectric layer relative to said active area of said insulated-gate field-effect device to provide an abnormal concentration of temperature-freed ions in said portion of said additional dielectric layer, and permitting said additional dielectric layer to cool down and thereby substantially immobilize said temperature-freed ions in said portion of said additional dielectric layer, said insulated-gate field-effect device also having spaced-apart electrodes that are connected by said layer of semiconductor and that serve as source and drain electrodes, said gate electrode of said insulated-gate field-effect device being separated from said layer of semi-conductor of said insulated-gate field-effect device by said dielectric layer of said insulated-gate field-effect device, and said spaced-apart electrodes and said gate electrode being connected together, while said electric field in that portion of said additional dielectric layer which is adjacent said active area of said insulated-gate field-effect device is being developed, but being subsequently disconnected from each other.

6. The method of making an insulated-gate field-effect device, that has a layer of semi-conductor and a dielectric layer and a gate electrode, so it has a desired voltage-current characteristic which comprises disposing an additional dielectric layer adjacent the active area of said insulated-gate field-effect device, said additional dielectric layer being in addition to the dielectric layer of said insulated-gate field-effect device and being spaced away from the gate electrode of said insulated-gate field-effect device, heating said additional dielectric layer to a temperature at which temperature-freed ions in said additional dielectric layer become readily mobile, and developing a D.C. electric field in that portion of said additional dielectric layer which is adjacent said active area of said insulated-gate field-effect device to effect drifting of said temperature-freed ions in said portion of said additional dielectric layer relative to said active area of said insulated-gate field-effect device to provide an abnormal concentration of temperature-freed ions in said portion of said additional dielectric layer, and permitting said additional dielectric layer to cool down and thereby substantially immobilize said temperature-freed ions in said portion of said additional dielectric layer, discontinuing said electric field and measuring the voltage-current characteristic of said insulated-gate field-effect device while said additional dielectric layer is maintained in a heated condition, and subsequently developing an electric field of the required polarity in said portion of said additional dielectric layer which is adjacent said active area of said insulated-gate field-effect device while said additional dielectric layer is maintained in said heated condition to provide said desired voltage-current characteristic for said insulated-gate field-effect device.

References Cited

UNITED STATES PATENTS

| | | | |
|---|---|---|---|
| 3,258,663 | 6/1966 | Weimer | 317—235 |
| 3,351,786 | 11/1967 | Muller et al. | |
| 3,386,163 | 6/1968 | Brennemann | 29—571 |

PAUL M. COHEN, Primary Examiner

U.S. Cl. X.R.

29—574, 576; 317—235